United States Patent [19]
Hackl et al.

[11] Patent Number: 4,810,955
[45] Date of Patent: Mar. 7, 1989

[54] MEASURING APPARATUS FOR DETERMINING THE COUNTERVOLTAGE OF ELECTRIC MOTORS

[75] Inventors: Franz Hackl, Martinsberg; Franz Wohrer, Puchenau, both of Austria

[73] Assignee: Siemens Aktiengesellschaft, Berlin and Munich, Fed. Rep. of Germany

[21] Appl. No.: 85,431

[22] Filed: Aug. 13, 1987

Related U.S. Application Data

[63] Continuation-in-part of Ser. No. 852,305, Apr. 15, 1986.

Foreign Application Priority Data

Apr. 16, 1985 [AT] Austria .................. 1144/85

[51] Int. Cl.$^4$ .................. G01R 19/00; G01R 19/25
[52] U.S. Cl. .................. 324/158 MG; 318/345 A; 318/345 CA
[58] Field of Search ........... 318/314, 317, 331, 345 E, 318/345 AB, 345 A, 345 C, 345 CA, 347; 364/481, 174; 324/158 MG

[56] References Cited

U.S. PATENT DOCUMENTS

| | | | |
|---|---|---|---|
| 3,593,087 | 7/1971 | Pantelakis et al. | 318/345 A |
| 3,683,252 | 8/1972 | Maynard | 318/345 CA |
| 4,346,434 | 8/1982 | Morinaga | 318/345 CA |
| 4,749,944 | 6/1988 | Okamoto | 322/27 |

OTHER PUBLICATIONS

"A Microprocessor-Controlled Fast-Response Speed Regulator with Dual Mode Current Loop for DCM Drives", by Ohmal et al., IEEE Trans. on Industry Applications, vol. IA-16, #3, 5/80, pp. 388–394.

"A Performance Analysis of Microprocessor-Based Control Systems Applied to Adjustable Speed Motor Drives", by Konishi et al., IEEE Trans. on Ind. Applics, vol. IA-16, #3, 5/80, pp. 378–387.

"Digitale Regelung und Steuerung einer Stromrichter-Gespeisten Gleichstrommaschine mit Mikrorechner", 8129 Regelungstechnik, 30/1/82, pp. 378–387, by Magyar et al.

Primary Examiner—Reinhard J. Eisenzopf
Assistant Examiner—W. Burns
Attorney, Agent, or Firm—Kenyon & Kenyon

[57] ABSTRACT

For controlling d-c motors which are supplied with an armature current obtained by phase gating, the bucking voltage induced in the motor is particularly well suited. This voltage is calculated indirectly by a measuring unit which calculates the instantaneous bucking voltage of the d-c machine as a function of the phase gating angle calculated in the preceding computing cycle, the measured current conduction angle, the measured magnitude of the line voltage, the mean armature current value and the armature circuit resistance specific to the machine and the armature circuit inductance specific to the machine.

1 Claim, 2 Drawing Sheets

MEASURING APPARATUS FOR DETERMINING THE COUNTERVOLTAGE OF ELECTRIC MOTORS

CROSS REFERENCE TO RELATED APPLICATION

This application is a continuation-in-part of Ser. No. 852,305, filed Apr. 15, 1986.

BACKGROUND OF THE INVENTION

The subject of the present invention is a measuring unit for determining the countervoltage or bucking voltage of electric motors which is particularly well suited for controlling d-c machines which are supplied with an armature current obtained by phase gating from a thyristor-controlled three-phase rectifier bridge.

Direct current motors which are employed in machine tools are subject, on the one hand, to heavy load variations and must be adapted, on the other hand, to rapidly varying operating conditions. This requires a control with the aid of a parameter which allows the determination of the prevailing operating state of the motor in a particularly characteristic manner According to experience, the bucking voltage generated in the motor is suited best as the parameter, which depends on the magnetic excitation as well as on the speed of the motor.

As to the present state of the art, it can be stated that the control of d-c machines by controlled rectifier bridges is known through U.S. Pat. No. 3,593,087, where, however, the armature voltage is measured and not calculated. This applies also to the control for d-c machines described in U.S. Pat. Nos. 3,683,252, 4,356,434 on the controlled by a processor, no determination of the bucking voltage is involved.

For an explanation of the relationships required for an understanding of the invention, the basic circuit diagram of the speed control device of a d-c machine supplied from a three phase network by means of a thyristor controlled rectifier bridge is shown in FIG. 1 of the drawing which substantially also corresponds to the circuits which are shown in IEEE Transactions on Industry Applications Vol. IA-16, No. 3 (June 1980), "A Performance Analysis of Microprocessor-Based Control Systems . . . ", pages 378 to 387 in FIGS. 1 and 3. However, FIG. 1 of the drawing also shows, in addition to the circuit known from the prior art, the measuring unit according to the invention for determining the bucking voltage as well as a pilot control device serving to achieve a high dynamic range of 12 the current control circuit, which makes the knowledge of the bucking voltage necessary. The circuit shown is realized in digital form in a microprocessor, where the control lines shown are understood to be information flow lines.

The machine speed to be preset in each case is applied as the reference value $n_s$ to the input of the circuit and is compared in a difference member D1 with the actual speed value $n_i$. The speed control deviation obtained as the difference of both values is fed in a first speed control loop to a first controller R1 which furnishes from its output a current reference value $I_s$ corresponding to the speed control deviation. By means of a second difference member D2, this current reference value $I_s$ is compared with an actual current value $I_i$ and the current control deviation resulting as the difference of both values is fed in a second subordinated current control loop to a second controller R2 which furnishes at its output a value $\alpha_1$ corresponding to the current control deviation for the phase gating angle $\alpha$. The controller R2 is usually a PI controller, the output variable of which is utilized for controlling the rectifier bridge GB which feeds the directly connected d-c machine GM. Into the armature circuit of the d-c machine GM is inserted a d-c transformer GW which furnishes the prevailing actual current value $I_i$ to the difference member D2 in binary coded form. The prevailing actual speed value $n_i$ of the d-c machine GM measured by a tachometer generator TD is furnished to the difference member D1 also in binary coded form.

A speed change of the d-c machine GM, using the circuit elements described so far, of the speed control device, follows a fast changing speed reference value $n_s$ relatively slowly. This can be improved by making the phase gating angle dependent not only on the phase current control deviation $(I_s - I_i)$, but additionally also on the bucking voltage E induced in the armature of the d-c machine GM and the current reference value $I_s$. To this end, the relatively high armature voltage could be taken off directly at the terminals of the d-c machine, then be separated d-c wise from the machine, subjected after smoothing to an analog to-digital conversion and be corrected by the ohmic armature voltage drop. This form of determining the bucking voltage would require additional hardware and be heavily delayed by the necessary smoothing and would therefore not be suited for a highly dynamic control.

SUMMARY OF THE INVENTION

The present invention has, therefore, addressed the problem of determining the bucking voltage, by providing a measuring unit which operates with a very small time delay and with as little hardware as possible.

According to the invention, this is achieved by a microprocessor which continuously calculates the instantaneous bucking voltage E of the d-c machine in accordance with a relationship $E(t) = u(t) - i(t)R - L(di/dt)$ by solving the equations $E = U_{mx}[\cos(\pi/3 + \alpha) - \cos(\pi/3 + \alpha + \delta)]/\delta - I_m R\,(T/\delta')$ on the one hand, for interrupted current flow (current with gaps) and $E = U_{mx}[\cos(\pi/3 + \alpha) - \cos(\pi/3 + \alpha + \delta)]/\delta - I_m R - L\,(\Delta I_m/T)$ on the other hand, for uninterrupted current flow (current without gaps) in successive computing cycles, where the following relations apply:

$U_{mx}$ is the averaged amplitude value of the phase voltages which is obtained by means of a transformer from the linked voltage of two phases of the supplying three phase 12 network, $\alpha$ is the phase gating angle calculated in the preceding computing cycle according to the provided phase gating control, $\delta$ is the current conduction angle shown in units of arc which is determined by means of a comparator connected to a d-c transformer inserted into the armature circuit from the time difference between the leading and trailing edges of 20 triggered current pulses, $\delta'$ is the current conduction angle measure in a time scale, $I_m$ is the mean value of the armature current which is obtained by means of the d-c transformer, R is the ohmic armature circuit resistance specific to the machine, L is the armature circuit inductance specific to the machine, and T is the duration of the preceding thyristor firing interval.

BRIEF DESCRIPTION OF THE DRAWINGS

For a further explanation of the invention, reference is made to the drawings, in which.

FIG. I shows a diagram of the speed control device of a d-c machine supplied from a three phase network by means of a thyristor controlled rectifier bridge.

DETAILED DESCRIPTION

Figure 2:
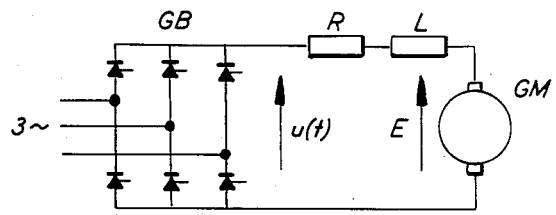
FIG. 2 shows the basic wiring diagram of the armature circuit of the d-c machine GM which is supplied from the rectifier bridge GB.

FIG. 2 of the drawing shows the basic wiring diagram of the armature circuit of the d-c machine GM which is supplied from the rectifier bridge GB. The time-dependent value of the supplying output voltage of the rectifier bridge GB is designated with u(t) and is at equilibrium with the bucking voltage E generated in the armature of the d-c machine GM as well as with the ohmic voltage drop IR in the armature circuit and the inductive voltage drop L (di/dt) at the armature circuit inductance L. From this, the instantaneous value of the bucking voltage is calculated as $$E(t) = u(t) - i(t) R - L (di/dt).$$

Figure 1:
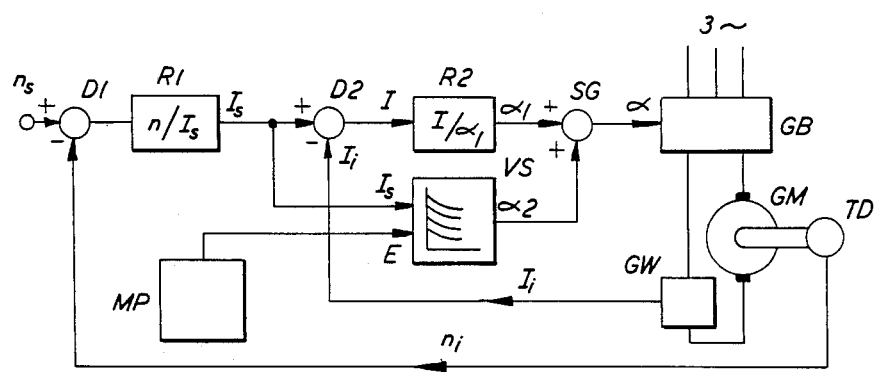

If the differential equation above is integrated over the time between two thyristor firing instants and is divided by the integration time T, the above-mentioned formulas for the value E are obtained which are programmed in the microprocessor MP. As is shown in FIG. 1, the thus obtained value E is fed to a pilot circuit VS which determines by means of a table stored in a matrix on the one hand and the respective value E of the bucking voltage on the other hand, and from the current reference value $I_s$ a second phase gating value $\alpha_2$. $(E,I_s)$ which, as the output value of the pilot circuit VS, is added up in an adding stage SG to the value $\alpha_1$, supplied by the controller R2 to controller R2 to the last valid value $\alpha = \alpha_1 + \alpha_2$. This form of combination of the phase gating angle utilized for controlling the rectifier bridge GB of a share $\alpha_1$ dependent on the actual current value and a share $\alpha_2$ dependent on the bucking voltage E and the current reference value only makes possible the desired speed of readjustment if the speed reference value $n_s$ is changed, taking into consideration the nonlinearity of the control characteristic in the transition from discontinuous current flow at low current to continuous current flow at higher current values.

Figure 3:
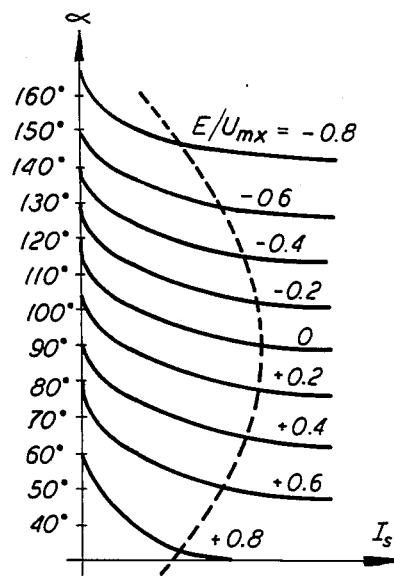
FIG. 3 shows the table stored in the pilot control circuit VS.

The table stored in the pilot control circuit VS is shown explicitly in FIG. 3 as a family of curves $\alpha(I_s,E)$, where the individual curves show, for given parameter values $E_i/U_{mx}$ of the bucking voltage $E$, the dependence of the phase gating angle $\alpha(I_s)$ as a function of the current reference value $I_s$. The dashed curve in the diagram separates the states of discontinuous current flow (with gaps) on the left side of the diagram from the states of continuous current flow (to the right of the dashed curve). An inverse presentation of this diagram, namely, the bucking voltage as a function of the armature current and of the phase gating angle as curve parameters may be found in the publication of IEEE Transactions on Industry Applications, Vol. IA-16 No. 3, page 390 in FIG. 3, "Load Characteristics of Thyristor Converter".

Figure 4:
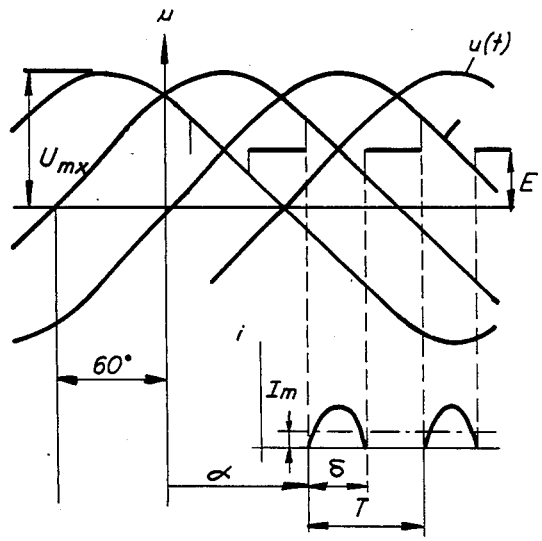
FIGS. 4 and 5 show the waveform of the voltages and currents, the diagram of a discontinuous current being shown in FIG. 4 and that of a continuous current in FIG. 5, where the quantities necessary for calculating the bucking voltage E are marked.
Figure 5:
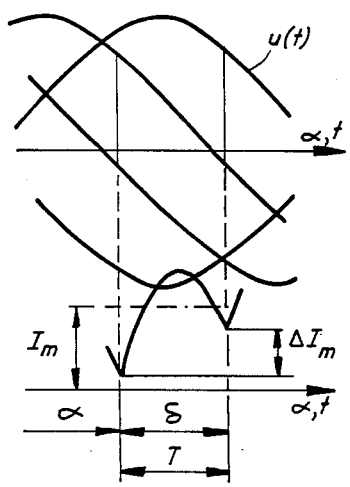

FIGS. 4 and 5 of the drawing show the waveform of the voltages and currents, the diagram of a discontinuous current being shown in FIG. 4 and that of a continuous current in FIG. 5, where the quantitites necessary for calculating the bucking voltage E are marked.

Figure 6:
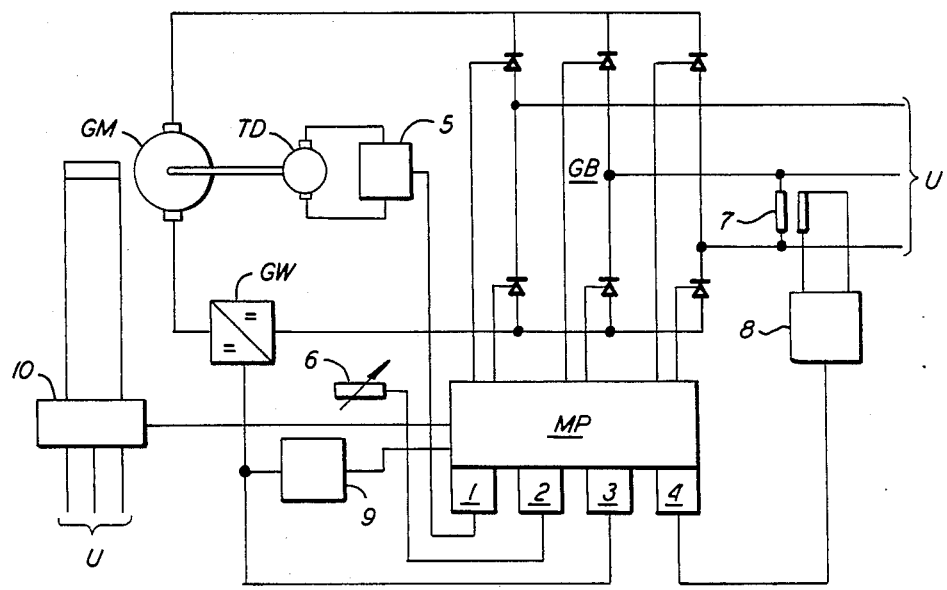
FIG. 6. shows an embodiment of the measuring element of a controller for a d-c motor driving a machine tool GM.

In FIG. 6 of the drawing, the measuring element of a controller for a d-c motor driving a machine tool, GM, is shown as an embodiment. The motor GM is supplied from the three phase network by means of a rectifier bridge GB. The rectifier bridge GB shown is suitable for furnishing a motor current of only one direction. If, therefore, also different current directions are to be possible for the motor GM, a second rectifier bridge is provided which can be connected parallel to the rectifier bridge GB, but with opposite forward direction of its thyristors.

The thyristors of the rectifier GB are individually driven by a microprocessor MP which calculates anew, under the continuously changing conditions at a given clock rate of a few microseconds, the respectively applicable phase gating angle $\alpha$ and transmits it to the thyristors in the form of "on" pulses. With 1, 2, 3 and 4 are designated analog-to-digital converters preceding the microprocessor MP, in which the input values required for the calculations of the phase gating angles are converted into digital numbers.

The thyristors can be controlled in accordance with different aspects, either in the form of controlling the motor speed to a constant speed or to a constant torque. To this end it is necessary to determine the actual speed value of the motor GM, which purpose is served by a tachometer generator TD driven by the motor GM, the output signal of which is converted by a converter 5 into an analog voltage which is fed to the analog-to-digital converter 1. By means of a setting member 6, a speed reference value is entered which, converted into a voltage, is fed to an analog-to-digital converter 2 and entered by the latter as a digital number into the microprocessor MP.

For calculating the bucking voltage and for the current controller, the armature current of the motor GM is determined by means of a dc-to-dc transformer GW, the output variable of which is sampled by the analog-to-digital converter 3 and is converted into digital numbers which can be determined by the microprocessor MP and from which the mean current value is calculated. Further required for the calculation of the bucking voltage is the magnitude of the line voltage. The latter is determined from the supplying three-phase voltage U as the linked voltage of two phases by means of a transformer 7, and by an evaluation circuit 8, the average value in time is formed therefrom, which is fed to the analog-to-digital converter 4.

For measuring the current conduction angle δ which, in stationary operation, can vary between 0° and 60°, serves a comparator 9 which derives from the signal of the d-c converter GW a signal which indicates that a current happens to be flowing. The time interval between the leading and the trailing edges of this signal indicates the current conduction angle δ. The microprocessor MP derives, if the armature current is discontinuous, the current conduction angle δ from the output signal of the comparator 9 by measuring the time difference. The calculation of the bucking voltage E further uses the armature circuit resistance R and the armature circuit inductance L which are specific for the respective motor. The calculation of the bucking voltage E further requires the knowledge of the phase gating angle α which, however, need not be measured since it is still present in the microprocessor MP after the computing cycle carried out last as a stored value.

With 10 is designated a setting member for determining the field current of the motor GM.

In the foregoing specification, the invention has been described with reference to an exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A measuring apparatus for determining the bucking voltage of an electric motor which is supplied with an armature current obtained by phase gating from a thyristor controlled three phase rectifier bridge phase gating circuit, comprising means for determining the current conduction angle of the d-c motor, means for determining the magnitude of the line voltage of the a-c network, means for determining the average value of the ohmic armature current of the d-c motor, means for determining the armature circuit resistance specific to the d-c motor and microprocessor means coupled to each of the aforementioned means, said microprocessor means calculating and providing the phase gating angle to the phase gating circuit supplied from the a-c network and furthermore continuously calculating in successive computing cycles the instantaneous bucking voltage of the d-c motor as a function of the phase gating angle calculated in a preceding computing cycle, the measured current conduction angle, the measured magnitude of the line voltage, the average value of the armature current and the armature circuit resistance specific to the machine according to the relationship $e(t) = u(t) - i(t)R - L(di/dt)$ by solving the equations $E = U_{mx}[\cos(\pi/3 + \alpha) - \cos(\pi/3 + \alpha + \delta)]/\delta - I_m R(T/\delta')$ for interrupted current flow (current with gaps) and $E = U_{mx}[\cos(\pi/3 + \alpha) - \cos(\pi/3 + \alpha + \delta)]/\delta - I_m R - L(\Delta I_m / T)$, respectively, for uninterrupted current flow (current without gaps) continuously calculated in successive computing cycles, where the following designations apply:

$U_{mx}$ is the mean amplitude value of the phase voltage which is obtained by said line voltage determining means comprising a transformer from the linked voltage of two phases of the supplying three phase a-c network, α is the phase gating angle calculated in the preceding computing cycle according to the phase gating control provided, δ is the current conduction angle shown in radians which is determined by said current conduction angle determining means comprising a comparator connected to a d-c transformer inserted into the armature circuit from the time difference between the rising and falling edges of triggered current pulses, δ' is the current conduction angle measure in time, $I_m$ is the mean value of the armature current which is obtained by said armature current determining means comprising a d-c transformer, R is the ohmic armature circuit resistance specific to the machine, L is the armature circuit inductance specific to the machine, and T is the duration of a preceding thyristor firing interval.

* * * * *